March 3, 1959

R. C. WILLIAMS ET AL 2,875,535

BULLDOZER

Filed Sept. 14, 1954

INVENTORS
Russell C. Williams &
BY Edwin J. Selyem

Paul ⟨signature⟩
ATTORNEY

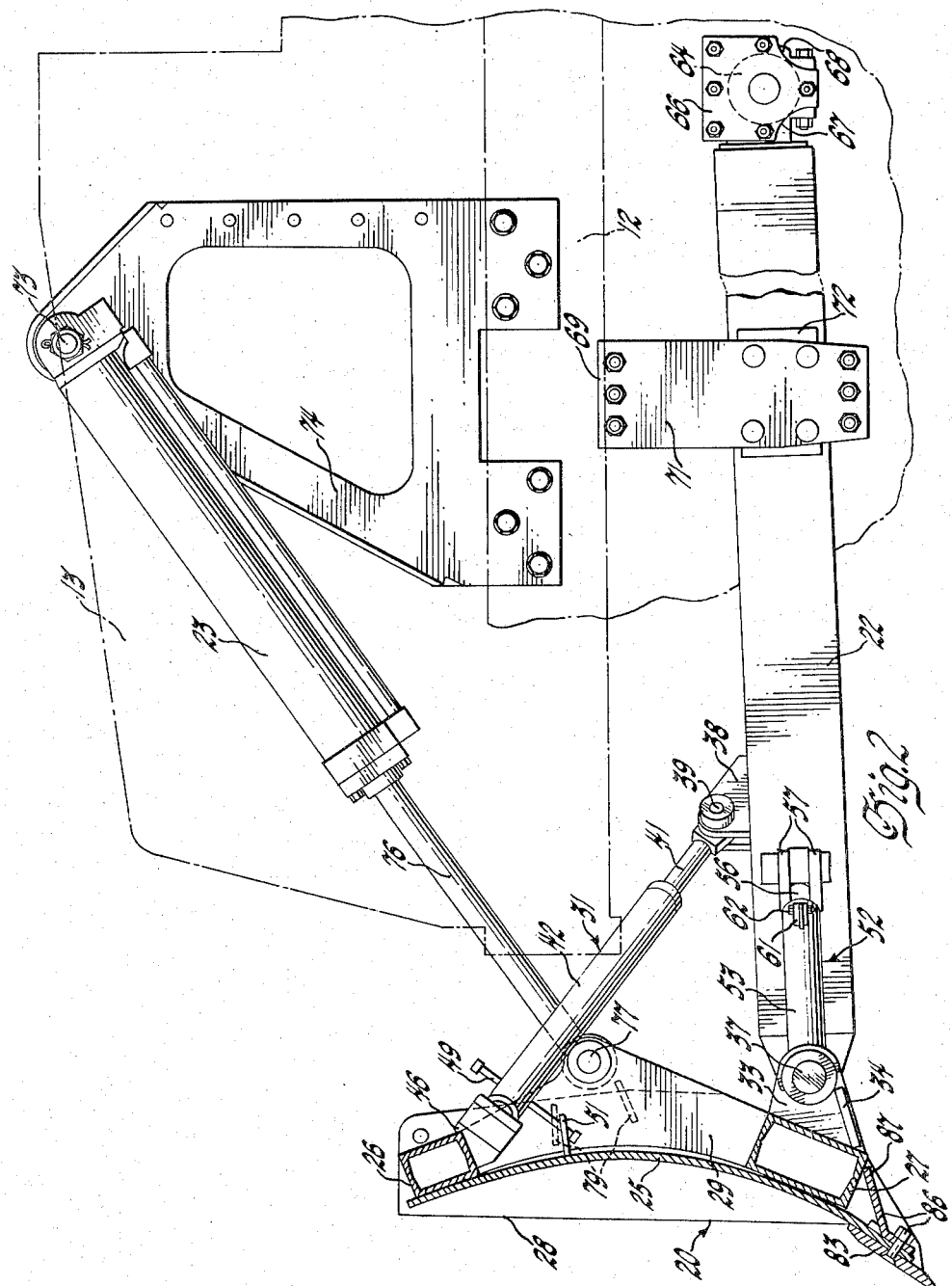

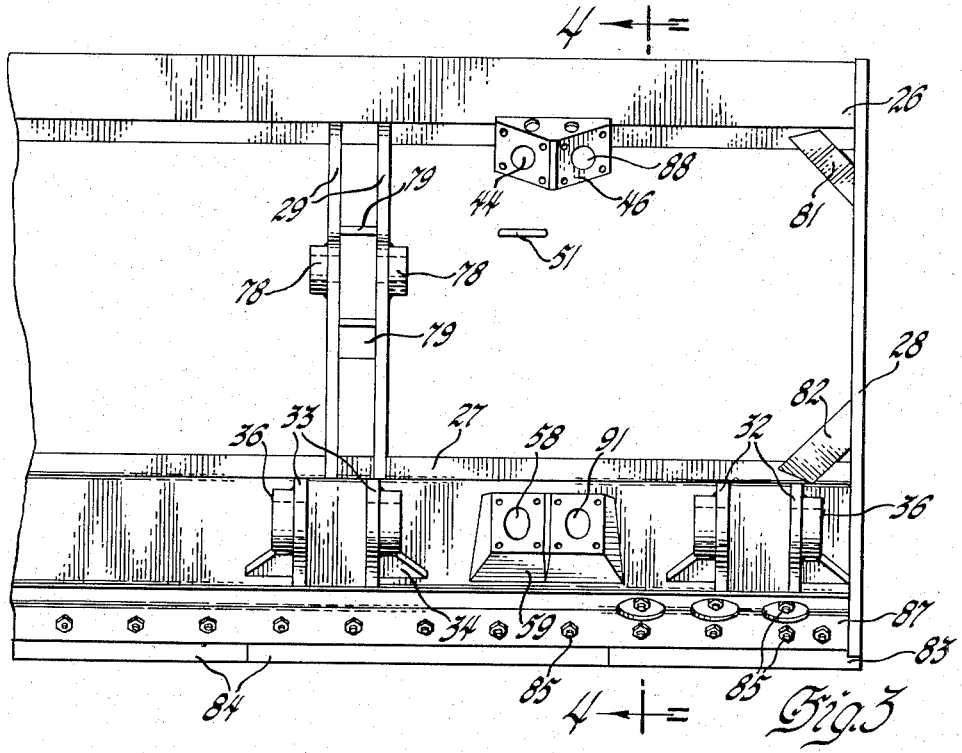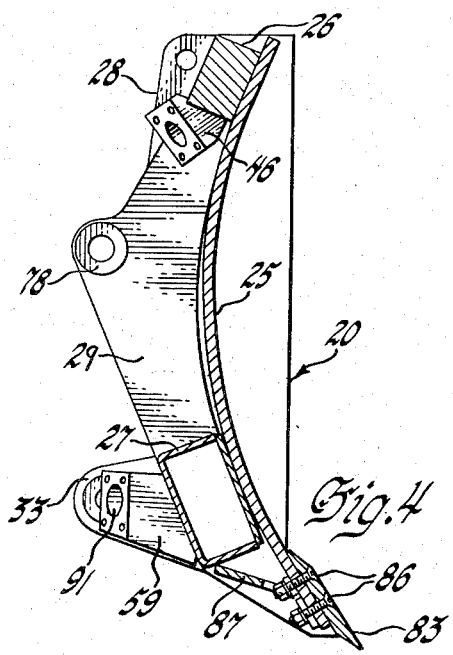

March 3, 1959    R. C. WILLIAMS ET AL    2,875,535
BULLDOZER
Filed Sept. 14, 1954    4 Sheets-Sheet 4
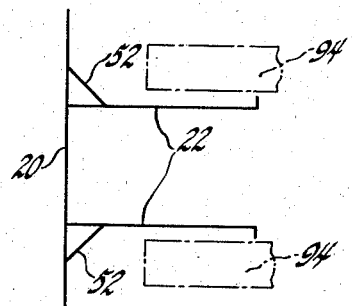
Fig.5
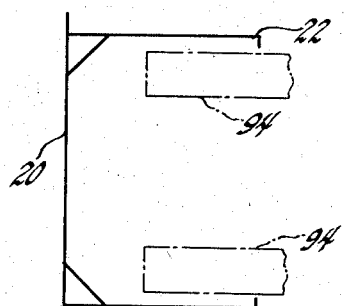
Fig.6
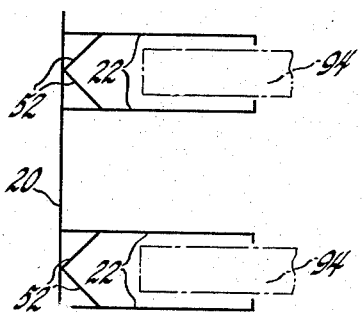
Fig.7
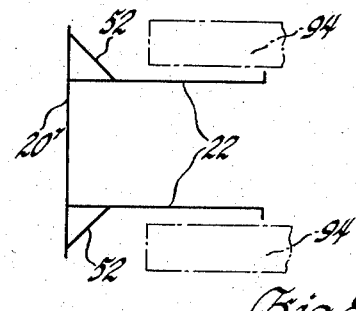
Fig.8
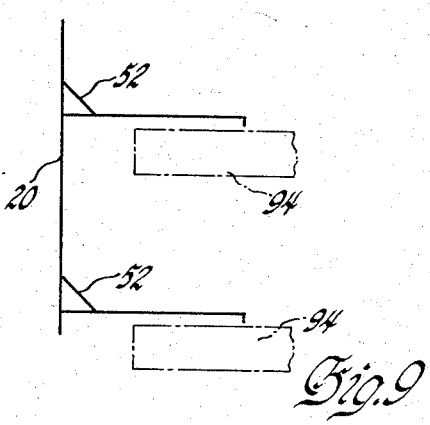
Fig.9
INVENTORS
Russell C. Williams, &
Edwin J. Selyem
BY
ATTORNEY

United States Patent Office 2,875,535
Patented Mar. 3, 1959

2,875,535
BULLDOZER

Russell C. Williams, Rocky River, and Edwin J. Selyem, North Royalton, Ohio, assignors to General Motors Corporation, Detroit, Mich., a corporation of Delaware Application September 14, 1954, Serial No. 455,904

7 Claims. (Cl. 37—144)

Our invention relates to earth moving machines of the type commonly known as bulldozers. The principal object of the invention is to provide a more powerful and more versatile bulldozer, better adapted to withstand the rigorous conditions under which such machines are used.

The bulldozer is best adapted for use with a twin engine crawler tractor described and claimed in a co-pending application of John P. Carrol et al., for Crawler Tractor, Serial No. 455,903, filed September 14, 1954, and is therefore shown in association with such a tractor although the invention may be used with other prime movers. A feature of the invention to which attention is particularly drawn is a bulldozer blade assembly of great strength, but with the moldboard supported with freedom to flex or yield slightly to reduce the transmission of shocks to the tractor and to diminish bending or denting of the moldboard. Another such feature is a particularly strong and adaptable push beam installation in which push beams may be mounted either inside or outside of the crawler track frames, or both; or may be mounted with one inside and one outside for asymmetrical disposition of the moldboard.

The nature of the invention and the advantages thereof will be more particularly apparent from the succeeding detailed description of the invention and the accompanying drawings, in which:

Figure 2 is a left side elevation;

Figure 3 is a rear elevation of the moldboard assembly;

Figure 4 is a transverse section of the moldboard assembly taken on the plane indicated in Figure 3; and Figures 5 to 9 are diagrams of different configurations of push beams and bulldozer blades.

Figure 1:
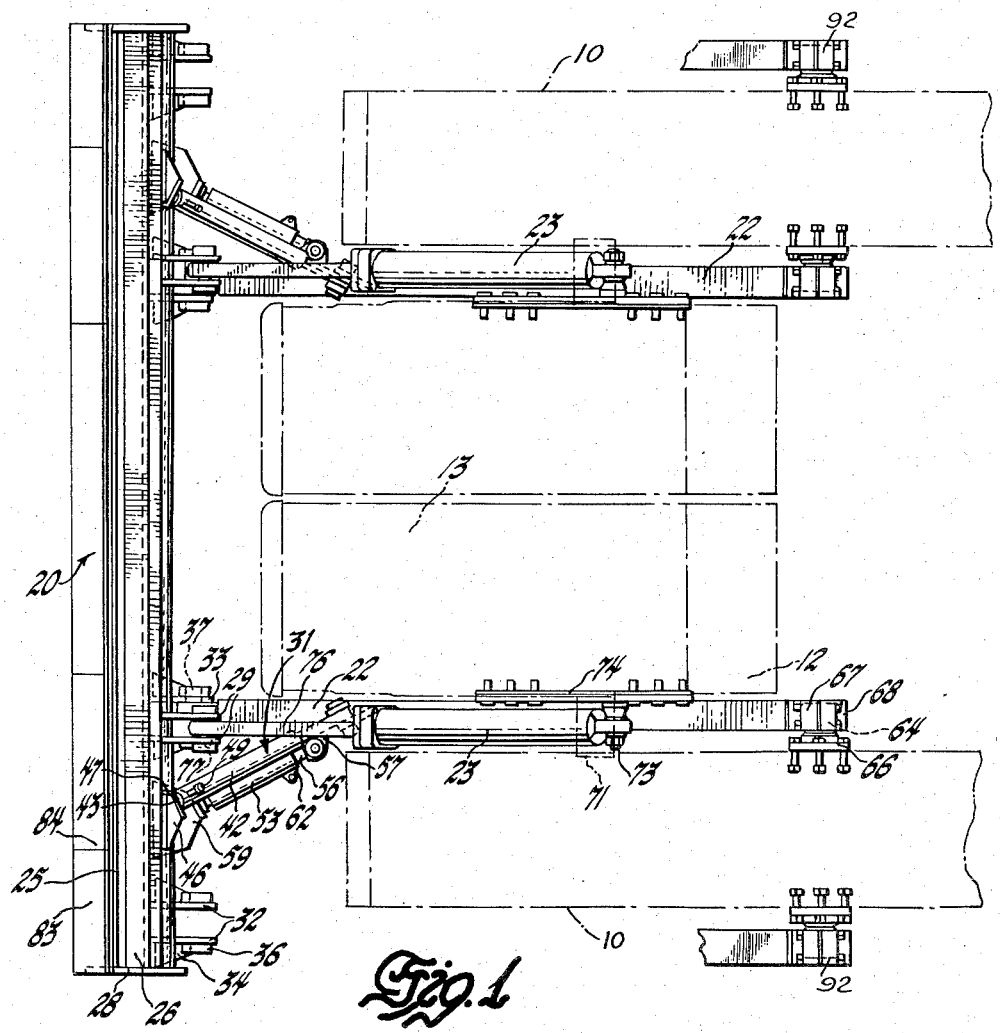
Figure 1 is a plan view showing the bulldozer blade mounted on the tractor, the tractor being shown in outline only.

The crawler tractor on which the bulldozer is shown mounted comprises a crawler track frame 10 at each side, on which is mounted a crawler track (not shown). Each track frame supports a power plant frame 12 on which is mounted an engine under hood 13, and other parts of the tractor which are not illustrated, since they are not material to an understanding of the present invention.

The principal parts of the bulldozer as illustrated in Figures 1 to 4 are a moldboard or blade assembly 20, right and left inner push beams 22, and right and left hydraulic cylinders 23 at each side of the tractor. Considering first the moldboard assembly 20, this comprises a moldboard 25 curved as indicated in Figures 2 and 4, a top crossbar 26, a bottom crossbar assembly 27, the bottom crossbar being a welded box section, side plates 28 at each end of the moldboard, and two pairs of cylinder attaching plates 29. The side plates 28 and attaching plates 29 extend vertically between the bars 26 and 27 and are welded to them. The lower bar 27 receives the principal thrust from the tractor, being directly coupled to the push beams 22. The upper bar 26 is coupled to the push beams by upper struts 31 to hold the moldboard against tipping. The side plates 28, which are welded to the outer edge of the moldboard, brace the edge of the moldboard and serve to interconnect the top and bottom bars. The cylinder attaching plates 29 also serve as structural members interconnecting the top and bottom bars at intermediate points of the blade, and provide for connection to the cylinders 23 which raise and lower the blade. Means for attaching the push beams are provided by clevises constituted by outer pairs of flanges 32 and inner pairs of flanges 33 at each side, the inner flanges 33 being coupled to the push beams as illustrated in Figures 1 and 2. These flanges are welded to the lower crossbars 27 and stiffened by gussets 34 and have welded thereon bosses 36. The flanges and bosses are bored for coupling pins 37. The clevis connection between the push beam and the moldboard assembly provides for varying the tilt of the moldboard by adjusting the length of the upper struts 31. Each strut 31 is mounted at its lower end in a clevis 38, similar to those previously described, by a pin 39 extending through an eye at the end of a threaded rod 41 which is received in the threaded tubular upper end portion 42 of the strut. A ball 43 at the upper end of the strut is received in a hemispherical socket 44 in a bracket 46 welded to the upper crossbar 26. The socket for the ball 43 is completed by a cap 47 bolted to the face of the bracket 46. A slidable bar 49 extending through the sleeve 42 provides for turning it to thread it onto the rod 41 and thus vary the length of the strut and the inclination of the moldboard. It is held against undesired movement by a U-bar 51 welded to the moldboard into which the bar slides when it is not in use.

An additional connection between each push beam and the moldboard is provided by a lower strut assembly 52. Each comprises a sleeve 53 with a ball at the front end and a rod 56 with an eye at the rear end, the eye being mounted in a pin and clevis mount 57 and the ball end being seated in a hemispherical socket 58 in a bracket 59 welded to the lower crossbar. The sleeve 53 is split and provided with ears 61 clamped by bolts 62 so that the length of the strut 52 may be adjusted for proper fit.

As will be apparent, the strut 52 not only reduces the strain on the outer end of the crossbar 27, but also provides a triangular bracing of the structure to hold it square and prevent lateral movement of the push beams.

The push beam 22 is a heavy box section strut mounted for rotation about a spherical support 64 integral with a plate 66 bolted to the inside of the track frame by a spherical fitting comprising a socket 67 fixed to the push beam and a cap 68 bolted thereon.

The push beams are restrained against sidesway by a wear plate 69 bolted to a plate 71 fixed to and depending from the tractor frame 12, which cooperates with a removable wear plate 72 fixed to the outer face of the push beam.

The blade is raised by the double-acting hydraulic cylinders 23, which may be of suitable commercial type. The upper end of each cylinder is rotatably mounted on a pin 73 extending from a rigid bracket 74 bolted onto the frame 12. The piston rod 76 has an eye rotatable on a pin 77 extending through bored bosses 78 in the cylinder attaching plates 29. These attaching plates are connected by gussets 79.

The cylinders 23 may be connected in parallel to any suitable source of hydraulic fluid and control valve, to raise and lower the blade.

Continuing with the structure of the moldboard assembly 20, gussets 81 and 82 strengthen the corners, connecting crossbars 26 and 27 to side plates 28. Mounted on the lower edge of the moldboard are end bits 83 and cutting edge pieces 84, secured by plow bolts 86. Plates 87 brace the lower corners of the moldboard.

As will be most clearly apparent from Figure 4, the moldboard 25 is spaced from the plates 29. It is welded to the crossbars 26 and 27, and is free between them so as to be able to yield slightly to shocks or blows to reduce transmission of shock to the track frame and the hydraulic cylinders. The plate 25 is substantially heavier than usual practice, but dispenses with stiffeners usually employed. It thus relies upon local stiffness in combination with the natural resiliency of the span between the crossbars to reduce markedly the susceptibility of the moldboard to damage.

Either end of the moldboard may be raised relative to the other by differential adjustment of the upper struts 31. As will be apparent, shortening one strut tends to lower the corresponding end of the blade. This is accommodated by the ball supports 64.

As illustrated in Figures 1 and 2, the moldboard is supported by push beams mounted inside the track frames. Provision is made for the use alternatively or additionally of push beams mounted outside the track frames. Considering first the moldboard assembly, the outer flanges 32 provide clevises for exteriorly mounted push beams. The block 46 has an outwardly facing socket 88 for an upper strut, and the block 59 on the lower crossbar provides a socket 91 for a lower strut. The upper and lower sockets are displaced equal distances laterally from the push beam clevises 32 and 33. Therefore, a push beam 22 with struts 31 and 52 adapted for inboard mounting on the left side of the tractor may be used unchanged for outboard mounting on the rgiht side; and vice versa.

The rear ends of the exerior push beams are mounted on ball supports 92 similar to the supports 64 which may be bolted or otherwise removably fixed to the outside of the track frame 10.

Various bulldozer mounting arrangements made possible by this construction are illustrated diagrammatically in Figures 5 to 10. Figure 5 corresponds to Figure 1, with a wide blade and inboard push beams. The crawler tracks are indicated at 94.

Figure 6 illustrates the same blade with outboard push beams. In Figure 7, both inboard and outboard push beams are mounted, an arrangement offering advantages for very heavy work, providing most substantial support for a long blade.

Figure 8 illustrates a short blade, identified as 20', with inboard push beams only. This blade may be similar to blade 20 with the outboard push beam connections eliminated.

Figure 9 shows an off-center mounting utilizing two push beam assemblies of like hand connected to the moldboard assembly 20, the left-hand push beam being mounted between the outer flanges 32 and the right-hand between the inner flanges 33. A suitable connection between the cylinder 23 and the moldboard assembly accommodates the offsetting of the moldboard relative to the cylinders. Plates 29 may be offset, or additional cylinder couplings may be provided. Obviously, by using push beams of the other hand, the blade may be offset to the left.

It will be obvious that with push beams mounted outboard of the track frames 94 as shown in Figures 6, 7 and 9, the push beams will be connected to ball supports 92 shown in Figure 1.

The strength, convenience, and flexibility of this push beam arrangement will be apparent, as will the structural strength and durability of the improved moldboard assembly.

The description herein of the preferred embodiment is not to be considered as limiting the invention, as many modifications of structure may be devised by the exercise of skill in the art within the scope of the invention.

We claim:

1. In combination, a tractor having a longitudinally extending frame member at each side thereof, pivotal mounts extending laterally inboard and outboard from each of said frame members, a moldboard mountable transversely across the end of said tractor, pairs of pivotal mounts laterally spaced on said moldboard, each of said pairs including an inboard and outboard pivotal mount, strut connecting means substantially equidistantly spaced from each inboard and outboard mount, at least one pair of longitudinally extending push beams, struts operatively secured respectively to each push beam and extending obliquely from the vertical plane of the latter in opposite directions for connection with said strut connecting means, and means for connecting said push beams to either frame member mount and an associated one of each pair of moldboard mounts.

2. In combination, a tractor having a longitudinally extending frame member at each side thereof, pivotal mounts extending laterally inboard and outboard from each of said frame members, a moldboard mountable transversely across the end of said tractor, pairs of pivotal mounts laterally spaced on said moldboards, each of said pairs including an inboard and outboard pivotal mount, strut connecting means substantially equidistantly spaced from each inboard and outboard moldboard mount, and at least one pair of longitudinally extending push beams each including a strut secured thereto and extending obliquely from the vertical plane of said push beam for connection to said strut connecting means, said push beams each being supportable on the outboard mount of one of said frame members and the outboard mount of one of said pairs of moldboard mounts, and supportable on the inboard mount of the other of said frame members and the inboard mount of the other of said pairs of moldboard mounts.

3. In combination, a tractor having a longitudinally extending frame member at each side thereof, pivotal mounts extending laterally inboard and outboard from each of said frame members, a moldboard mountable transversely across the end of said tractor, pairs of pivotal mounts laterally spaced on said moldboard, each of said pairs including an inboard and outboard pivotal mount, and push beams including means operatively connectible to one mount of each of said frame members and to one mount of each of said pairs of moldboard mounts, said push beams being interchangeable from one frame member to the other for operable connection between the other respective frame member mount and the other of each pair of moldboard mounts.

4. In combination, a tractor having a longitudinally extending frame member at each side thereof, pivotal mounts extending laterally inboard and outboard from each of said frame members, a moldboard mountable transversely across the end of said tractor, pairs of pivotal mounts laterally spaced on said moldboard, each of said pairs including an inboard and outboard pivotal mount, strut connecting means substantially equidistantly spaced from each inboard and outboard moldboard mount, push beams including means operatively connectible to one mount of each of said frame members and to one mount of each of said pairs of moldboard mounts, a strut operatively secured to each push beam and operatively connectible with said strut connecting means, said push beams being interchangeable from one frame member to the other for operable connection between the other respective frame member mount and the other of each pair of moldboard mounts.

5. In combination, a tractor having a longitudinally extending frame member at each side thereof, pivotal mounts extending laterally inboard and outboard from each of said frame members, a moldboard mounted transversely across the end of said tractor, pairs of pivotal mounts laterally spaced on said moldboard, each of said pairs including an inboard and outboard pivotal mount, strut connecting means equidistantly spaced from each inboard and outboard moldboard mount, push beams including means operatively connectible to one mount of each of said frame members and to one mount of each of said pairs of moldboard mounts, a strut operatively secured to each push beam and extending obliquely from the vertical plane of the latter for operative connection with said strut connecting means, said push beams being interchangeable from one frame member to the other for operable connection between the other respective frame member mount and the other of each pair of moldboard mounts.

6. In combination, a tractor having a longitudinally extending frame member at each side thereof, pivotal mounts extending laterally inboard and outboard from each of said frame members, a moldboard mounted transversely across the end of said tractor, pairs of pivotal mounts laterally spaced on said moldboard, each of said pairs including an inboard and outboard pivotal mount, strut connecting means substantially equidistantly spaced from each inboard and outboard moldboard mount, at least one pair of longitudinally extending push beams, struts operatively secured respectively to each push beam and extending obliquely from the vertical plane of the latter in opposite directions for connection with said strut connecting means, and means for connecting a respective one of said push beams to either frame member mount and an associated one of each pair of moldboard mounts.

7. In combination, a tractor having a longitudinally extending frame member at each side thereof, pivotal mounts extending laterally inboard and outboard from each of said frame members, a moldboard mounted transversely across the end of said tractor, pairs of pivotal mounts laterally spaced on said moldboard, each of said pairs including an inboard and outboard pivotal mount, strut connecting means substantially equidistantly spaced from each inboard and outboard moldboard mount, at least one pair of longitudinally extending push beams, struts operatively secured respectively to each push beam and extending obliquely from the vertical plane of the latter in opposite directions for connection with said strut connecting means, means for connecting said push beams to either frame member mount and an associated one of each pair of moldboard mounts, and a second pair of push beams including struts each one of which is substantially identical to the respective ones of said first pair of push beams, said second pair of push beams being connectible to the other mount of each frame member and the other of each pair of moldboard mounts.

References Cited in the file of this patent
UNITED STATES PATENTS

| | | |
|---|---|---|
| 1,890,228 | Miller | Dec. 6, 1932 |
| 1,976,597 | Bird | Oct. 9, 1934 |
| 1,981,287 | Ritchie | Nov. 20, 1934 |
| 2,163,662 | Buffington | June 27, 1939 |
| 2,452,774 | Le Tourneau | Nov. 2, 1948 |
| 2,526,589 | Stevenson | Oct. 17, 1950 |